United States Patent [19]

Wada et al.

[11] Patent Number: 4,697,744
[45] Date of Patent: Oct. 6, 1987

[54] PROCESS FOR THE PRODUCTION OF IRON OXIDE FINE POWDER

[75] Inventors: Minoru Wada, Ibaraki; Chikara Hidaka; Takeshi Noma, both of Mobara, all of Japan

[73] Assignee: Sumitomo Metal Industries, Ltd., Osaka, Japan

[21] Appl. No.: 785,615

[22] Filed: Oct. 9, 1985

[30] Foreign Application Priority Data

Oct. 16, 1984 [JP] Japan ............................ 59-216566
Mar. 11, 1985 [JP] Japan ............................ 60-047946
Aug. 7, 1985 [JP] Japan ............................ 60-173909

[51] Int. Cl.$^4$ ............................................. B02C 19/12
[52] U.S. Cl. ............................................. 241/20; 241/24; 241/29; 75/2
[58] Field of Search ......................... 241/19, 20, 29, 24, 241/21, 81, 79.1; 75/2

[56] References Cited

U.S. PATENT DOCUMENTS

| | | | |
|---|---|---|---|
| 3,291,398 | 12/1966 | Weston et al. | 241/24 |
| 3,791,595 | 2/1974 | Aubrey, Jr. | 241/24 X |
| 4,206,878 | 6/1980 | Forciea | 241/24 X |
| 4,416,768 | 11/1983 | Nosseir | 241/24 X |

Primary Examiner—Mark Rosenbaum
Attorney, Agent, or Firm—Burns, Doane, Swecker & Mathis

[57] ABSTRACT

A process for producing iron oxide fine powder of high purity from an oxide iron ore such as hematite or magnetite by only physical processing is disclosed, which comprises the steps of: providing a preliminarily ground raw material powder of an oxide iron ore or a mixture thereof having the impurity content in a specific range; classifying the raw material iron ore powder under such conditions that fine particles smaller than 10 μm in diameter are removed from the ore powder; optionally treating the classified powder with an acid solution; refining the classified, optionally acid-treated iron ore powder by means of gravity concentration; and finish grinding the refined powder to reduce the particle size to a desired level.

24 Claims, 12 Drawing Figures

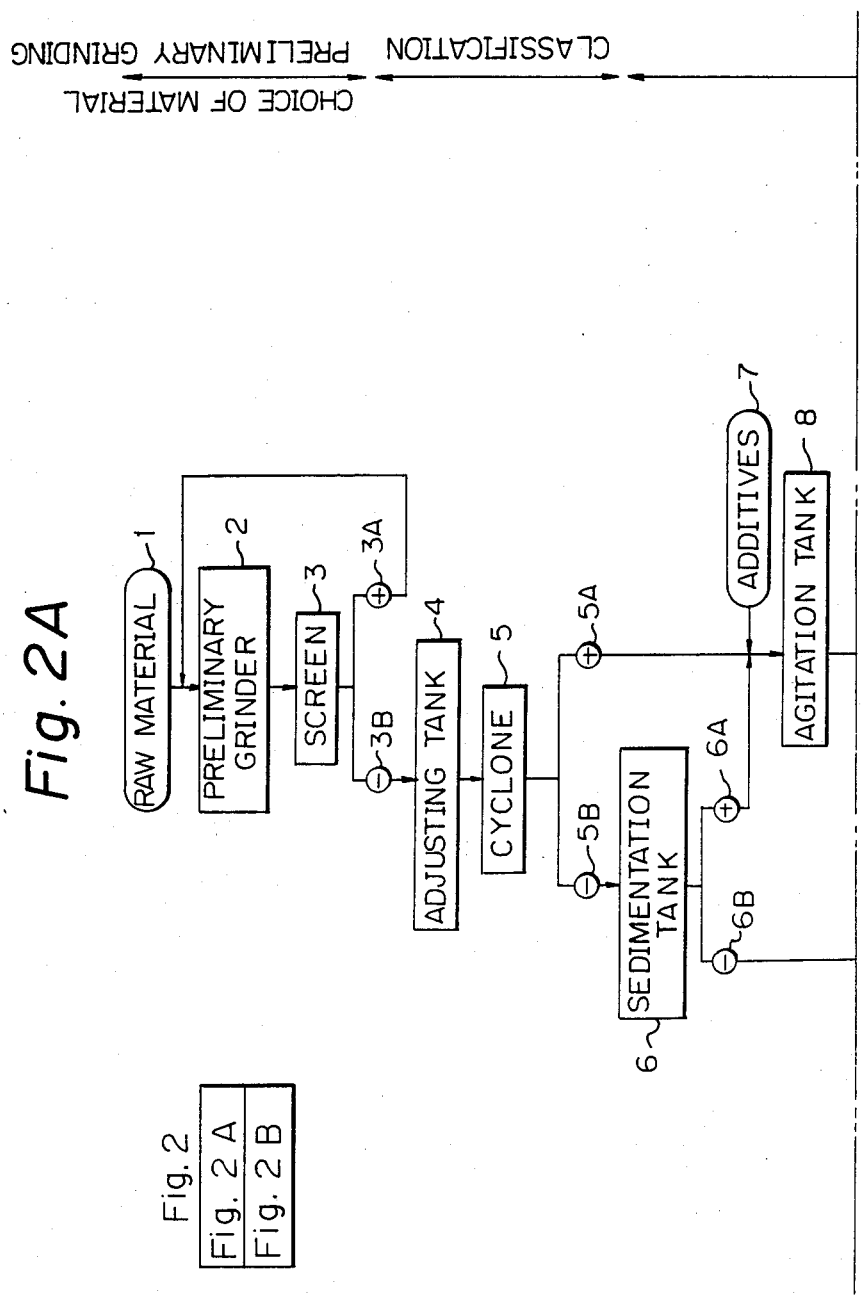

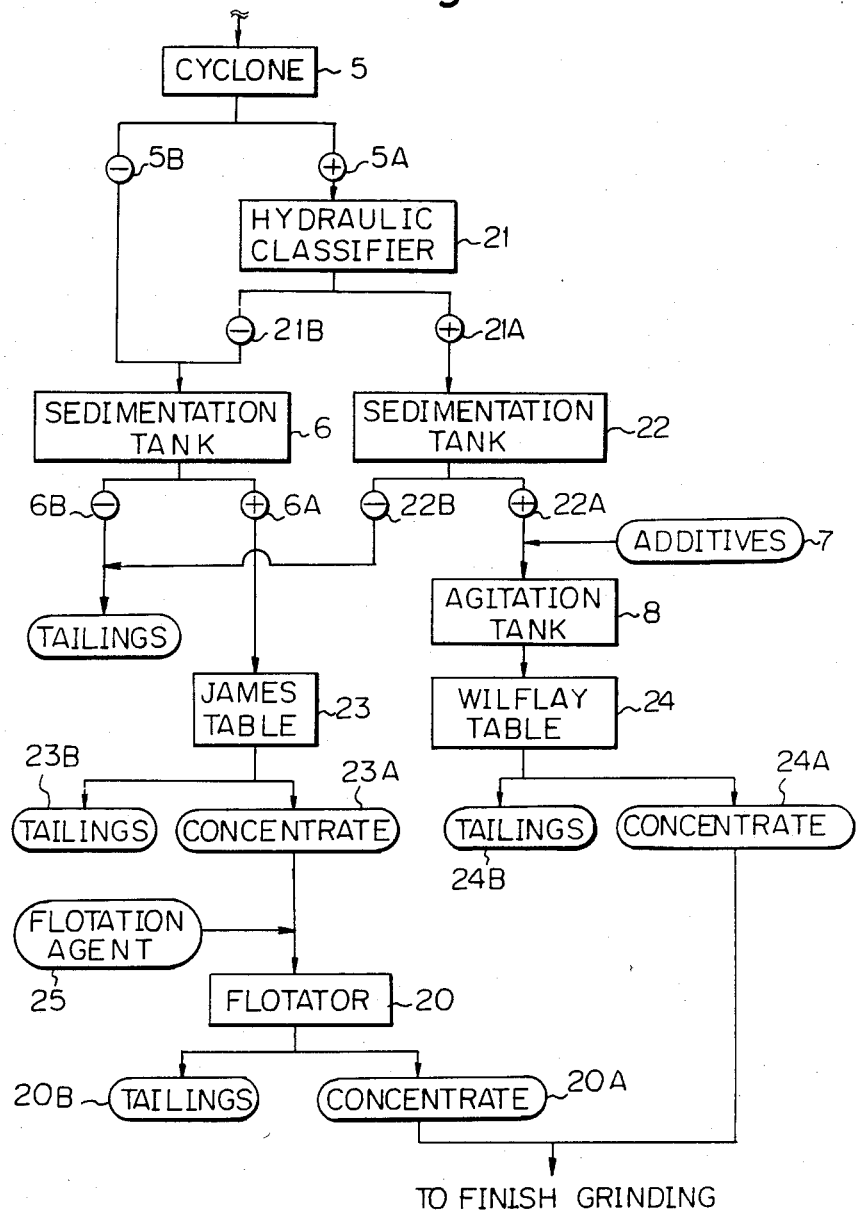

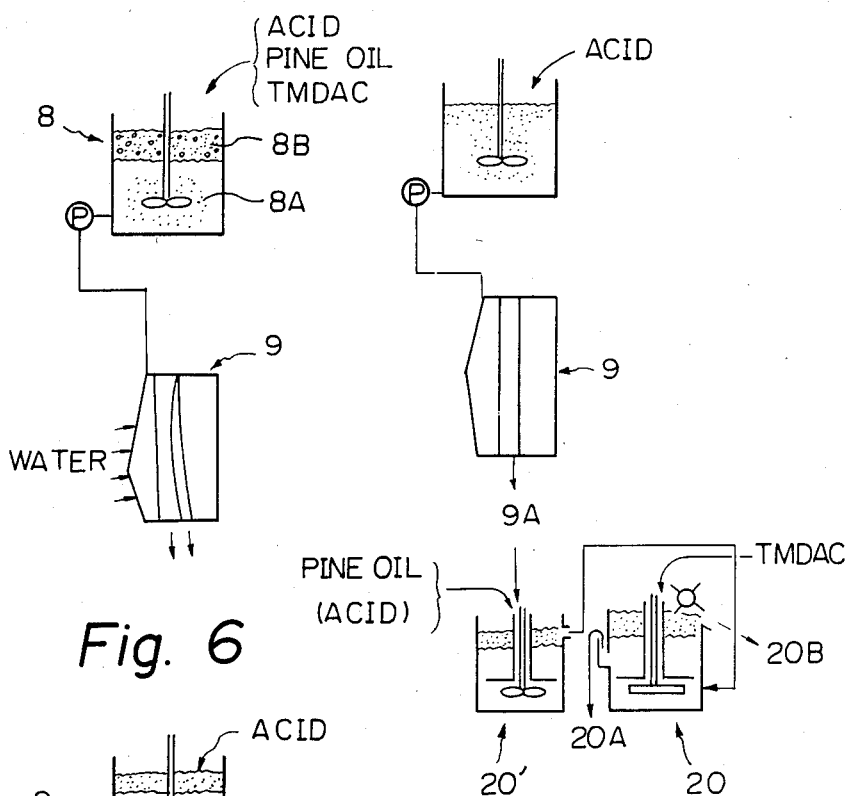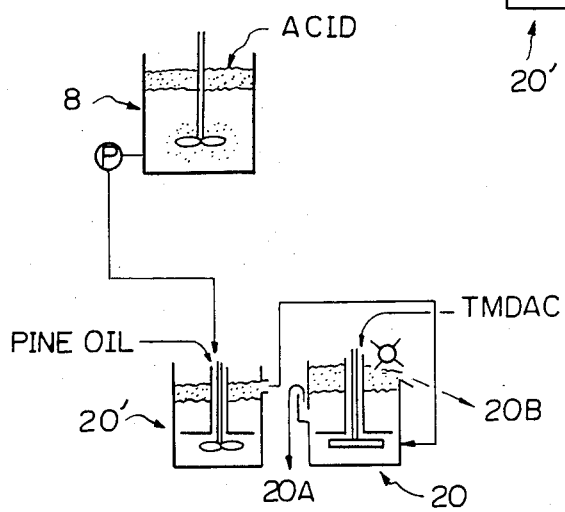

PROCESS FOR THE PRODUCTION OF IRON OXIDE FINE POWDER

BACKGROUND OF THE INVENTION

1. Field of the Invention

The present invention relates to a process for the production of iron oxide fine powder of high purity suitable for use in manufacturing ferrite magnets and other applications. More particularly, it concerns a process for producing high purity iron oxide fine powder from a naturally occurring oxide iron ore such as hematite (comprised predominantly of $Fe_2O_3$), magnetite (comprised predominantly of $Fe_3O_4$), or a mixture thereof by physical refining of the ore.

2. Prior Art

Fine powder of ferric oxide ($Fe_2O_3$) useful for the manufacture of ferrite magnets is most commonly produced from a waste pickling solution generated voluminously in steelworks. From the waste solution which contains iron as a chloride or sulfate salt depending on the acid used in the pickling treatment, the iron value contained therein is recovered and then roasted to yield iron oxide. See, for example, Japanese patent Laid-Open application Nos. 58-151335 and 48-73414.

However, the use of ferrite magnets has been increasing, resulting in an increased demand for high purity iron oxide fine powder as a raw material therefor. In order to meet the increased demand, iron ores have also been used to produce iron oxide fine powder. According to one process heretofore developed in the art to produce iron oxide fine powder from iron ore, a sulfide iron ore such as pyrite or pyrrhotite is finely ground and then classified to remove coarse particles. The classified powder is then concentrated by flotation using a xanthate as a collector and finally roasted to give iron oxide fine powder. Another process starting from magnetite ($Fe_3O_4$) involves finely grinding the magnetite ore to a particle size in the range of from 0.1 to 5 $\mu$m followed by magnetic separation and refining.

A similar process starting from hematite which is first finely ground and then subjected to magnetic separation is disclosed in Japanese patent Laid-Open application No. 58-20730.

The iron oxide as a raw material for a ferrite has to possess the quality specified in JIS-K-1462 in order to achieve the desired magnetic properties in the ferrite product. Specifically, it is required to have a content of various impurities such as $SiO_2$, $Al_2O_3$, sulfates and chlorides which do not exceed the prescribed upper limits as shown in Table 1 below which is the same as Table 1 annexed to JIS-K-1462.

TABLE 1

| Specifications for iron oxide for manufacture of ferrites as defined in JIS-K-1462 | | | |
|---|---|---|---|
|  | Class 1 | Class 2 | Class 3 |
| % $Fe_2O_3$ | ≧99.0 | ≧98.8 | ≧98.5 |
| % Loss on drying | ≦0.30 | ≦0.30 | ≦0.30 |
| % $SiO_2$ | ≦0.01 | ≦0.06 | ≦0.30 |
| % Al | ≦0.02 | ≦0.02 | ≦0.05 |
| % Mn | ≦0.30 | ≦0.30 | ≦0.30 |
| % Ca | ≦0.01 | ≦0.02 | ≦0.04 |
| % $SO_4^{2-}$ | — | ≦0.20 | ≦0.30 |
| % $Cl^-$ | — | ≦0.15 | ≦0.15 |

In the above table, the specifications under Class 1 are for iron oxide powder for use in the manufacture of soft ferrites which are widely employed as magnetic cores. Class 3 is for iron oxide powder for use in the manufacture of hard ferrites which are useful as permanent magnets. The iron oxide powder specified under Class 2 is useful for the manufacture of both hard and soft ferrites.

Using the prior art processes mentioned above, however, it is difficult to produce powdery iron oxide products of high purity which meet the requirements shown in the above specifications. For example, the iron oxide product from a waste pickling solution inevitably contains, an appreciable amount of sulfates or chlorides which come from the acid. It is difficult to remove these impurities from the product substantially completely and in addition the production cost is relatively high because the process includes a costly roasting step. Similarly, in the process starting from a sulfide iron ore, it is difficult to lower the sulfate content of the iron oxide product to the desired level and, in addition, a costly roasting step is included. The process starting from magnetite involves the step of finely grinding the ore prior to magnetic concentration, thereby frequently decreasing the refining efficiency in the magnetic concentration because fine particles of impurities tend to be entrained by iron oxide particles being collected magnetically. The latter two processes starting from iron ores are also disadvantageous in that the starting materials are restricted to particular, less commonly employed iron ores such as magnetite and sulfide iron ores (pyrite, pyrrhotite).

Accordingly, there is still a need for a suitable process of producing high purity iron oxide fine powder inexpensively from an iron ore to satisfy the increasing demand for such powder.

Thus it is an object of the present invention to provide a process for the production of high purity iron oxide fine powder from an oxide iron ore by means of only physical treatment and without chemical reaction such as roasting.

Another object of the invention is to provide a process for the production of high purity iron oxide fine powder which meets the requirements for purity as specified in JIS-K-1462 under Class 3.

A still further object of the invention is to provide a process for the production of high purity iron oxide fine powder from an oxide iron ore of the types which are commonly employed in steelworks and which are readily available.

These and other objects as well as the scope, nature and utilization of the present invention will be apparent to those skilled in the art from the following description and appended claims.

SUMMARY OF THE INVENTION

In accordance with the present invention, there is provided a process for producing fine powder of high purity iron oxide from an oxide iron ore such as hematite or magnetite which comprises the steps of: (a) providing as a raw material an oxide iron ore or a mixture thereof in the form of preliminarily ground powder in which the total amount of metal oxide impurities having a specific gravity between 4.5 and 5.5 (e.g., $Cr_2O_3$, $MnO_2$, $MnO$) and/or being capable of forming a double oxide with an iron oxide (e.g., CaO, MnO, BaO, $TiO_2$) present in the raw material is not greater than 1.5% by weight based on the total weight of iron oxides present therein; (b) subjecting the iron oxide powder to classification under such conditions that fine particles smaller than 10 $\mu$m in diameter are removed from the ore; (c)

refining the classified powder by means of gravity concentration; and (d) finish grinding the refined powder to reduce the particle size to the desired level.

In one preferred embodiment of the present invention, the starting raw material is preliminarily ground hematite powder having the content of impurities as defined herein.

In another preferred embodiment, prior to or during the refining step, the classified powder is subjected to acid treatment by dipping the powder in an acid solution.

BRIEF DESCRIPTION OF THE DRAWINGS

FIGS. 3 through 7 are partial flow charts showing variations in the classification and refining steps.

DETAILED DESCRIPTION OF THE INVENTION

Figure 1:
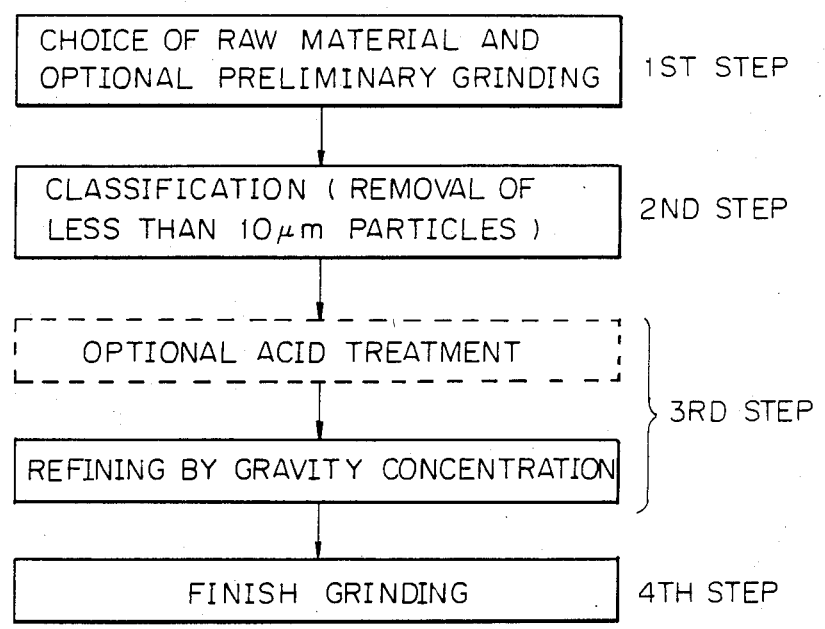
FIG. 1 is a simplified flow chart of the process of the present invention.

The present invention will now be described more fully with referring to the accompanying drawings.

The starting material used in the process of the invention is an oxide iron ore such as hematite, magnetite, or a mixture thereof. Such iron ores, particularly hematite ores, are readily available and hence their stable supply in sufficient amounts can be ensured in contrast with the cases where a waste pickling solution is employed as the starting material.

Oxide iron ores generally contain, in addition to iron oxides such as $Fe_2O_3$, $Fe_3O_4$ and $FeO$, various impurities including silica, alumina, manganese oxide, magnesium oxide, calcium oxide, titanium oxide, chromium oxide, phosphorus oxide, etc., and many of these impurities may be present in the ore as natural gangues in the form of hydrates, double oxides or other complicated forms. For example, the impurities may occur in the ore as gibbsite $[Al(OH)_3]$, apatite $[Ca_3(PO_4)_2CaF_2]$, talc $[Mg(OH)_2(Si_2O_5)_2]$ kaolinite $[Al_2O_3.2SiO_2.2H_2O]$, or simply as oxides as in quartz $[SiO_2]$.

Among these gangues, while quartz may be present in the form of relatively coarse particles usually less than 1 mm in diameter, most of them are comprised of medium to fine particles, on the order of from submicrons to several hundred microns. A major part of the impurities found in oxide iron ores are $SiO_2$- and/or $Al_2O_3$- containing ones. In order to produce high purity fine powder of iron oxides from an oxide iron ore, it is therefore necessary to remove these impurities by a suitable refining process.

One of typical processes employed to refine various ores is flotation. According to the conventional procedure of flotation, the ore to be refined is first subjected to grinding and classification, and if necessary these operations may be repeated until the particle size of the ore is reduced to the same level as that of the end product. Subsequently, the fine particles of the ore are refined by flotation to produce the end product, usually without further grinding.

It has been found, however, that when the above procedure is applied to an oxide iron ore to remove lighter impurities, most of these lighter impurities, particularly $SiO_2$ and $Al_2O_3$, cannot be separated effectively from the ore. This is because when the oxide iron ore which has been ground to fine particles on the order of microns, for example, is subjected to flotation, the fine iron oxide particles tend to agglomerate and the agglomerated particles readily float in the pulp, thereby interfering with separation of the floating particles of lighter impurities.

It has been found that the above-mentioned problem due to agglomeration of fine ore particles can be eliminated by applying flotation to relatively coarse particles of the iron ore obtained by classification of preliminarily ground ore so as to remove fine particles of smaller than 10 μm diameter. Such classification facilitates the subsequent flotation. Surprisingly, the classification employed in the process of the invention to remove fine particles affords another benefit to the refining process in that it also serves to remove a considerable part of $SiO_2$ and $Al_2O_3$ from the iron ore, thereby reducing the load to the subsequent flotation. In other words, such classification prior to flotation has a refining effect to some extent. The reason therefor is believed to be that $SiO_2$- or $Al_2O_3$-containing gangues generally either originally exist as fine particles of smaller than 10 μm in the ore or are relatively readily comminuted into such fine particles during the preliminary grinding as compared with iron oxide particles so that a finer fraction of preliminarily ground powder of an oxide iron ore contains more $SiO_2$ and $Al_2O_3$ than a coarser fraction thereof.

It has also been found that separation of $SiO_2$ and $Al_2O_3$ impurities from the preliminarily ground powder can be effected not only by flotation but by means of other gravity concentration methods such as table concentration and heavy media separation as well. However, some impurities such as MnO, $Cr_2O_3$, $TiO_2$, and CaO can not be removed efficiently by gravity concentration. Thus, as long as an oxide iron ore is refined by gravity concentration, the composition of the ore used as a raw material is particularly important in order to obtain high purity iron oxide as defined in JIS-K-1462.

In view of these findings, according to the present invention, it is necessary to employ a raw material oxide iron ore in which the content of impurities is in a particular range so as to enable it to be refined only by gravity concentration. Thus, as shown in FIG. 1, the first step of the process of the present invention is a choice of an appropriate iron ore and, if necessary, preliminary grinding.

Various metallic components usually found in oxide iron ores are shown in Table 2 below by grouping them into four categories (I) through (IV). It should be understood that these components, particularly impurities, may in practice occur in the ore as many types of more complicated forms as discussed previously. However, the metallic impurities in an iron ore are generally expressed in the form of oxides as shown in Table 2 for simplicity. Therefore, in order to provide a practical index for choosing a particular raw material useful in the process of the present invention, it is convenient to consider the metallic impurities in the ore as oxides as shown in Table 2.

TABLE 2

| Category | | Typical oxides |
| --- | --- | --- |
| (I) | Impurity of $P < 4.5$ or $P > 5.5$ | $SiO_2$, $Al_2O_3$, MgO, (CaO) |
| (II) | Impurity of | $Cr_2O_3$, $MnO_2$, MnO |

TABLE 2-continued

| | Category | Typical oxides |
|---|---|---|
| (III) | $4.5 \leq P \leq 5.5$ Fe compound-forming impurities | CaO, MnO, BaO, TiO$_2$ |
| (IV) | Iron oxides | Fe$_2$O$_3$, Fe$_3$O$_4$, FeO |

P = Specific gravity

The specific gravities of iron oxides (Fe$_2$O$_3$, Fe$_3$O$_4$, FeO) shown in Table 2 under Category (IV) are generally in the range of from 5.0 to 5.1. Therefore, those impurities having a specific gravity close to those of iron oxides, and specifically having a specific gravity between 4.5 to 5.5 such as Cr$_2$O$_3$, MnO$_2$ and MnO which are shown under Category (II) in Table 2 cannot be effectively separated from iron oxides by a gravity concentration technique due to small differences in specific gravity from iron oxides. In this respect, it is preferred that the content of these impurities in the raw iron ore be as low as possible.

The impurities shown under Category (III) can readily form a double oxide with an iron oxide (such a double oxide is hereunder referred to simply as an "iron compound") such as CaO.Fe$_2$O$_3$, MnO.Fe$_2$O$_3$, BaO.Fe$_2$O$_3$, and FeTiO. When these impurities are present as the above-mentioned iron compounds, it is difficult to separate them from iron oxides, and even if such separation can be achieved, the iron compounds of these impurities cannot be distinguished from iron oxides themselves by a conventional analytical technique. Therefore, for practical purposes, it is advisable to use a raw iron ore in which the content of impurities of Category (III) be as low as possible.

In contrast with the impurities of Categories (II) and (III), those impurities grouped under Category (I) such as SiO$_2$, Al$_2$O$_3$ and MgO have a significant difference in specific gravity from iron oxides. Therefore, if they do not readily form an iron compound with an iron oxide, then these impurities can be effectively separated from iron oxides by a gravity concentration technique, and their presence in a relatively large amount in a raw iron ore may be tolerated.

It has been found that a simple index effective for selecting a useful raw iron ore in the present process is given in terms of the sum of the weights of impurities (II) plus (III) expressed as a percentage of the total weight of the iron oxides of Category (IV). Thus, the raw material employed in the present process should satisfy the following inequality:

$$\frac{(II) + (III)}{(IV)} \times 100 \leq 1.5 \quad (1)$$

where (II), (III) and (IV) are the total contents in percent by weight of metal oxides of Categories (II), (III) and (IV), respectively, in the ore. In calculation, it should be noted that since MnO is shown under both of Categories (II) and (III), it must be treated as being only one of these categories. Similarly, CaO is shown in Table 2 under both of Categories (I) and (III) because its specific gravity is less than 4.5 and it can form an iron compound with iron oxide, but it should be regarded as an impurity under Category (III) in calculation. If a magnetite ore is used as a raw material, the content of Fe$_3$O$_4$ or FeO under Category (IV) should be converted to that as Fe$_2$O$_3$ in order to evaluate the ore on the same basis as hematite. As mentioned previously, separation of impurities (II) and (III) from iron oxides by gravity concentration is difficult or nearly, impossible. If the value calculated by the formula: [(II)+(III)]/(IV)×100 exceeds 1.5(%) for the raw oxide iron ore employed in the present process, a highly pure iron oxide product in which the content of the impurities are close to or meets the foregoing target given by JIS specifications cannot be consistently obtained. Preferably the above value of the raw iron ore is 1.3% or below.

Although any oxide iron ores which satisfy the requirement given by the above inequality (1) may be employed as a raw material in the process of the invention, typical of such ores are those occurring in Precambrian iron ore deposits such as Lake Superior type deposits and itabirite deposits, both predominantly comprised of hematite. More specifically, the Lake Superior type deposits mainly comprise speculite-type hematite and usually contain such minerals as quartz, calcite [CaCO$_3$], and anthophyllite [(MgFe)(OH)$_2$(Si$_4$O$_{11}$)$_2$] in minor proportions as accompanying gangues. The gangue minerals usually found in itabirite are quartz, gibbsite, and kaolinite. Although it is preferred to employ a hematite iron ore, other oxide iron ores such as magnetite or a mixture of hematite and other oxide iron ores may be utilized as a raw material as long as the above-mentioned requirement is satisfied. Preferably, the raw material iron ore contains at least 90%, and more preferably at least 95%, by weight of iron oxides.

In contrast with the iron ores mentioned above, those occurring in contact metasomatic deposits which contain a relatively large amount of CaO or in Mn-rich Precambrian banded iron ore deposits as well as magnetite sand which contains a relatively large amount of TiO are not useful in the present process because they generally do not satisfy the requirement given by the above inequality (1). Other relatively pure iron oxide sources such as dust collected in steelworks may be incorporated in minor proportions in the raw material.

Crude iron ores usually have undergone some processing including preliminary grinding, screening, classification, and some selection or enrichment treatment (e.g., hand selection, washing with water) in the mine before they are shipped to the customer. Of course, the raw material used in the process of the present invention includes such crude iron ores already processed or enriched to some extent by the miner, and iron ores may be evaluated for their purity by the grade of the ores preliminarily dressed for shipment. If necessary, the iron ore may be preliminarily enriched so as to satisfy the above requirement for the raw material. When the iron ore selected as a raw material is preliminarily ground by the miner to a particle size suitable for gravity concentration as in fine ores or pellet feed ores, it can be directly passed to the subsequent classification step without further grinding. Preferably, the preliminarily ground iron ore raw material has an average particle size in the range of from 20 to 200 μm. If the selected raw material is of a more coarse size than above as in lump iron ores, it should be preliminarily ground by a suitable grinder such as a jaw crusher or cone crusher for large size ores, or a ball mill or rod mill for medium size ores.

In the second step shown in FIG. 1, the preliminarily ground oxide iron ore selected so as to meet the requirement given by the above inequality (1) is classified, if necessary, after screening to remove extraordinarily large particles. The classification is carried out under such conditions that fine particles smaller than 10 μm in diameter are removed as much as possible. These fine particles generally tend to be charged on their surfaces and form agglomerated colloidal particles during the subsequent wet refining process such as flotation, thereby interfering with the refining. For this reason a substantial proportion of such fine particles should preferably be removed before the ore is refined by gravity concentration.

In practice, however, it is not possible to remove all the fine particles of smaller than 10 μm by classification using a conventional classifier. Therefore, a small portion of such fine particles initially present in the preliminarily ground ore will remain in the ore after the classification. It is preferred that the classified iron ore powder does not contain such fine particles in an amount exceeding 15% by weight based on the the total weight of the powder in order to ensure smooth operation in the subsequent gravity concentration. More preferably the amount of particles smaller than 10 μm is controlled to be not greater than 5% by weight.

The classification of the preliminarily ground oxide iron ore may be performed most conveniently by a wet cyclone, but other conventional wet classifiers such as a hydraulic classifier, or a dry classifier such as a zigzag classifier may be employed, too.

As mentioned previously, the classification also serves to separate a considerable portion of $SiO_2$- or $Al_2O_3$-containing gangues from the ore whereby the load imposed on the subsequent gravity concentration stage is substantially reduced.

In the classification step, it may be preferable in some instances but not essential that extremely coarse particles greater than 250 μm in diameter be also removed in addition to fine particles smaller than 10 μm. These coarse particles which are mainly composed of quartz have a tendency toward sedimentation in the pulp during flotation. When flotation is carried out in the subsequent gravity concentration, therefore, such coarse particles are preferably removed from the ore by classification. For this purpose, a hydraulic classifier or other appropriate wet classifier may be used.

Thus, according to the process of the present invention, the ore is introduced into a refining process in the form of relatively coarse particles from which fine particles of smaller than 10 μm are removed, and finish grinding follows the refining process. This is in direct contrast with not only the conventional refining technique commonly employed in flotation but also the above-mentioned prior art process disclosed in Japanese patent Laid-Open application No. 58-20730 in which the raw ore is first pulverized as fine as in the finish grinding and then refined by flotation or magnetic separation. This sequence of operations (finish grinding and then wet refining) is quite common in the field of wet refining of ores, particularly by flotation. Therefore, the process of the invention is quite unique in that the sequence of operations employed is in contradiction with the common one in the art.

The preliminarily ground, classified oxide iron ore powder is then subjected in the third step to gravity concentration to refine the ore to such an extent that it has the desired purity. For this purpose various gravity concentration techniques such as table concentration, wet cyclone refining, flotation (including flotation under pressure), heavy media separation, and a combination thereof may be employed. Magnetic separation which is not a gravity concentration technique may be utilized as an auxiliary refining measure in combination with one or more of the above gravity concentration techniques. For example, the table or flotation tank used in the gravity concentration may be magnetized in order to supplement the force of gravity or buoyant force applied to the powder.

Various techniques of gravity concentration are well known in the art and the optimum technique and operating conditions therefor may be selected by those skilled in the art depending on the particle size distribution, composition and other properties of the iron ore powder, and the desired purity of the product.

Before the gravity concentration, the classified iron ore powder may be treated with an acid solution, preferably having a pH of 5 or below and more preferably 4 or below. A useful acid solution may be prepared from an inorganic strong acid such as hydrochloric, hydrofluoric, sulfuric, or nitric acid, or a mixture thereof. It has been found that such acid treatment of the iron ore prior to refining serves to facilitate removal of gangues from the surfaces of the ores. More specifically, the surfaces of iron ores are usually not even and have many small recesses and a considerable part of gangues such as kaolinite and gibbsite are deposited in such recesses and cemented therein with iron oxide grains. It is therefore difficult to remove these gangues deposited in recesses by gravity concentration. After undergoing the action of an acid solution, however, such recessed gangues relatively readily come away from the recesses. Thus, the effect of the acid treatment is to weaken the bonding strength between iron oxide particles and gangues to facilitate removal of the gangues so that virtually no chemical reactions are involved therein. Therefore, the acid treatment employed herein is not intended to achieve any chemical processing.

In order to accelerate removal of gangues and floating of the removed gangues in the acid solution, it is preferred to carry out the acid treatment under agitation in the presence of one or more flotation agent. The flotation agents which can be added to the acid solution include foaming agents such as pine oil, MIBC, Flonal, and camphor oil; collectors such as xanthate, kerosine, Erofloat, trimethyldodecylammonium chloride (TMDAC), and sodium oleate; gangue depressants such as soda ash, lime, sodium silicate, and tannin; depressors such as lime, sodium cyanide, and dichromic acid; acitivators such as copper sulfate, sodium sulfide, and sulfuric acid; and modifiers such as lime, soda ash, and sulfuric acid. The addition of a foaming agent and a collector is particularly effective.

The acid treatment and the subsequent gravity concentration may be combined in various ways. For example, only one of either table concentration or flotation may be carried out after the acid treatment. Alternatively, the acid treated ore may be refined by a combination of table concentration and flotation in any order.

In some instances, the acid treatment may be conducted during gravity concentration. For example, the acid treatment may be carried out simultaneously with flotation by adding an acid to the pulp in a conditioning tank of the flotation process, or if both table concentration and flotation are employed it may be carried out between the table concentration and flotation or vice versa.

The acid treatment is usually continued for 15-120 minutes, and preferably for 30-90 minutes at room temperature. If desired, a higher temperature may be employed.

The iron ore powder which has been refined by gravity concentration or a combination of acid treatment and gravity concentration is finally finish-ground in the fourth step to give a highly pure iron oxide powder product having the desired particle size. When the product is intended for use in the manufacture of ferrite magnets, the average particle size of the iron oxide fine powder should preferably be reduced to from 0.5 to 5.0 $\mu$m, and more preferably from 0.8 to 2.0 $\mu$m. Any conventional finish grinder such as a ball mill, rod mill, attrition mill, or vibration mill combined with one or more classifiers may be utilized in the finish grinding step. The product obtained by the process according to the present invention is of high purity, preferably having the content of $SiO_2$ and $Al_2O_3$ reduced to no greater than 0.3% and no greater than 0.1%, respectively. In addition, the process includes no chemical processing such as roasting of a chloride or sulfide of iron and therefore the content of sulfates and chlorides in the product is negligibly low. Thus, the product is useful in various applications including manufacture of ferrite magnets, pigments and reduced iron powder.

Figure 2B:
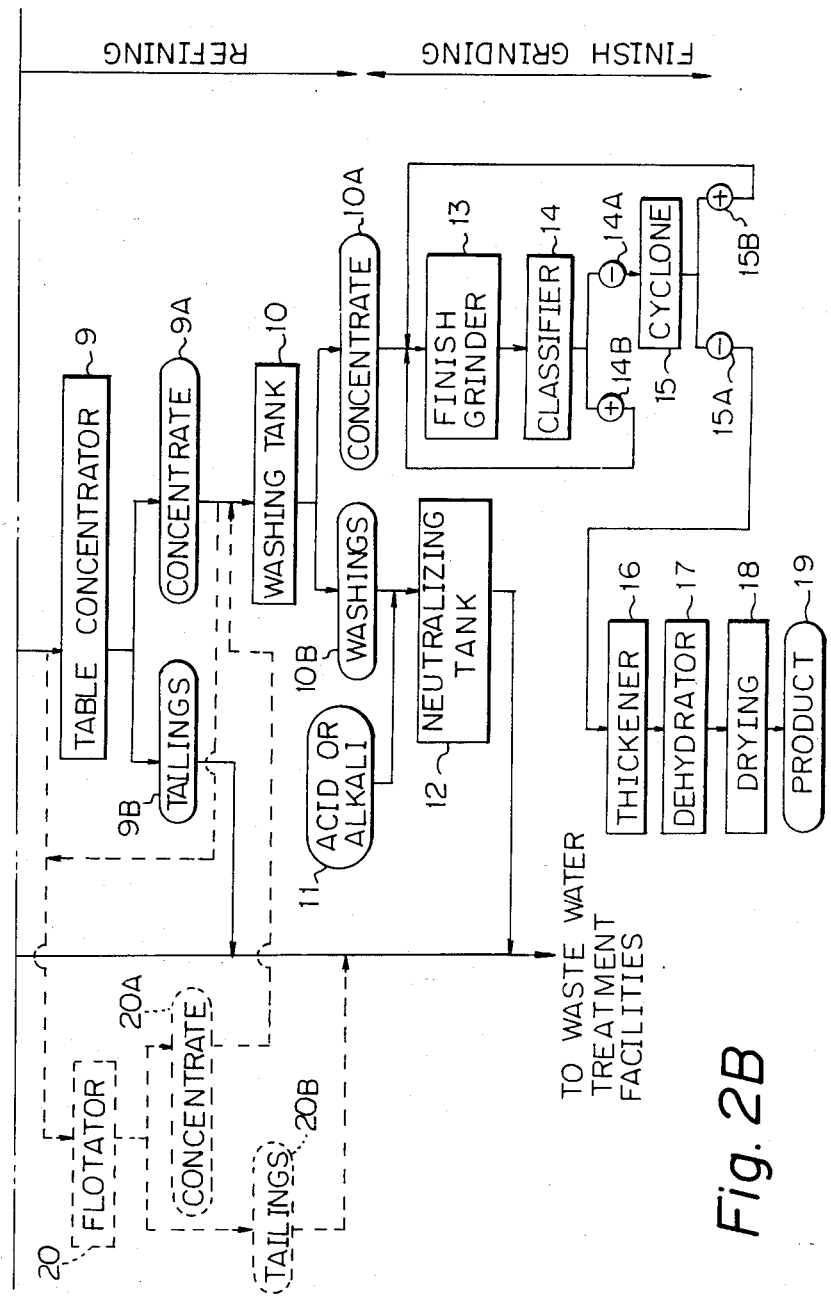
FIG. 2 is a detailed flow chart of a preferred embodiment of the present invention which because of length in broken into FIGS. 2a and 2b.

The process of the present invention will be specifically described with respect to preferred embodiments shown in FIGS. 2-7. In FIG. 2 (and in particular) in that portion of FIG. 2 shown as FIG. 2A), a raw material 1 which is an oxide iron ore such as high grade hematite (e.g., that occurring in Brazil) and which has usually been preliminarily dressed and/or ground in the mine is selected in such a manner that the total amount of metal oxide impurities having a specific gravity between 4.5 and 5.5 [Impurities (II) in Table 2] plus those capable of forming an iron compound [Impurities (III) in Table 2] does not exceed 1.5% by weight based on the total weight of iron oxides in the raw material. In the cases where the average particle size or size distribution of the raw material 1 is too large or too broad to be refined by the subsequent gravity concentration, it is preliminarily ground by a preliminary grinder 2 to reduce the average particle size to between 20 and 200 $\mu$m, for example, and then passed through a screen 3. The oversize is returned to the grinder 2. The raw material passed through the screen is introduced into an adjusting tank 4 where the concentration of the slurry of the ore powder prepared in this tank or previously is adjusted so as to optimize it for classification. With some iron ores such as powder ores for pelletizing, the preliminary grinding can be omitted and the raw material can be passed through the screen 3 in order to remove foreign matter such as wood chips, and extraordinarily large ore particles, or directly introduced into the tank 4 without screening.

The slurry in the tank 4 is then passed to a wet classifier such as a wet cyclone 5, which is operated under such conditions that fine particles of smaller than 10 $\mu$m are removed from the ore powder. As mentioned previously, the presence of a considerable amount of such fine particles will interfere with the subsequent gravity concentration. If desired, the underflow 5A of the cyclone 5 may be passed through another wet classifier such as a hydraulic classifier (not shown) in order to remove extremely coarse particles such as those having a size exceeding 250 $\mu$m. The removed coarse particles may be recycled to the preliminary grinder 2. The overflow 5B of the cyclone 5 (which contains fine particles of smaller than 10 $\mu$m as well as coarser particles) is introduced into a sedimentation tank 6 (e.g., a cone classifier) so as to recover relatively coarse particles of larger than 10 $\mu$m into the underflow 6A, which is combined with the underflow 5A from the cyclone 5. The overflow 6B of the sedimentation tank 6 is treated as tailings.

To the slurry of the combined flows 5A and 6A which contain relatively coarse ore particles and which are substantially freed from particles smaller than 10 $\mu$m, additives 7 which are conventionally used in wet gravity concentration processes are added. For example, lime or other alkaline material in an amount sufficient to adjust the pH of the slurry (which is usually weakly acidic) to the range of 6 -10, and a collector such as kerosine and/or a fatty acid or its salt (e.g., sodium oleate) may be added to the slurry.

The slurry is then agitated in an agitation tank 8 and thereafter passed to a table concentrator 9 (see FIG. 2B) where the ore particles in the slurry are separated into the concentrate 9A and tailings 9B. The type of table concentrator used may be selected depending on the particle size of the ore. For example, a James table is suitable for use in concentration of relatively fine particles ranging from about 10 to about 125 $\mu$m, while a Wilflay table, in concentration of coarser particles from about 30 to about 250 $\mu$m or greater.

The concentrate 9A at the table concentrator which contains substantially decreased amounts of impurities, particularly with respect to $SiO_2$ and $Al_2O_3$, is passed to a finish grinder 13, if desired, after it is washed with water in a washing tank 10. The washings 10B discharged from the washing tank 10 may be neutralized with an acid or alkali 11, as necessary, in a neutralizing tank 12 before they are directed to waste water treatment facilities.

The finish grinding of the unwashed or washed concentrate 9A or 10A may be performed using a conventional finish grinder, e.g, an Attritor or Tower Mill (both tradenames) whereby the particle size of the refined particles is reduced to that suitable for the intended use. The finish ground particles are then classified through a classifier 14 such as an Eakins classifier, and the overflow (undersize) 14A is passed to a cyclone 15 where it is further classified. The oversize 14B of the classifier 14 is returned to the finish grinder 13 together with the oversize 15B of the cyclone 15. The overflow or undersize 15A of the cyclone 15 is passed to a thickener 16 and then to a dehydrator 17 (e.g., a belt filter). The dehydrated cake is finally dried at 18 to yield the desired fine powder product 19 of high purity iron oxide.

As shown by the dotted lines in FIG. 2, the refining by gravity concentration may be conducted by flotation in place of the table concentration at the table 9, or in combination with the table concentration. In the former case, the slurry discharged from the agitation tank 8 is introduced into a flotator 20 after being passed through a conditioning tank (not shown) and separated into the concentrate 20A (bottom layer) and tailings 20B (upper foam layer).

To the slurry in the conditioning tank or flotator, various flotation agents as mentioned above may be added; for example, a calcium compound such as Ca(OH)$_2$ may be added in an amount sufficient to adjust the pH within a weak alkaline region of from 9 to 10, preferably from 9.5 to 9.8 to activate $SiO_2$ gangues by calcium ions, and a collector such as a fatty acid or its salt (e.g., sodium oleate) and/or an amine, as well as an iron depressing agent such as starch may be added in the following amounts for each ton of the ore particles in the slurry:
Sodium oleate: 100–300 g/t
Amine : 200–400 g/t
Starch 50–150 g/t.

The concentrate 20A is then passed to the finish grinder 13, if desired, through the washing tank 10, and processed as above. When both the table concentration and flotation are utilized, the concentrate 9A from the table concentrator 9 may be introduced into the flotator 20. Although it is less preferable, the order of these refining operations may be reversed by first conducting the flotation and passing the concentrate 20A of the flotator 20 to the table concentrator 9.

In the flotation it is rather difficult to separate coarse gangue particles of more than about 250 μm. It is therefore preferable to remove such particles from the ore in the preceding classification and/or table concentration.

Figure 4:
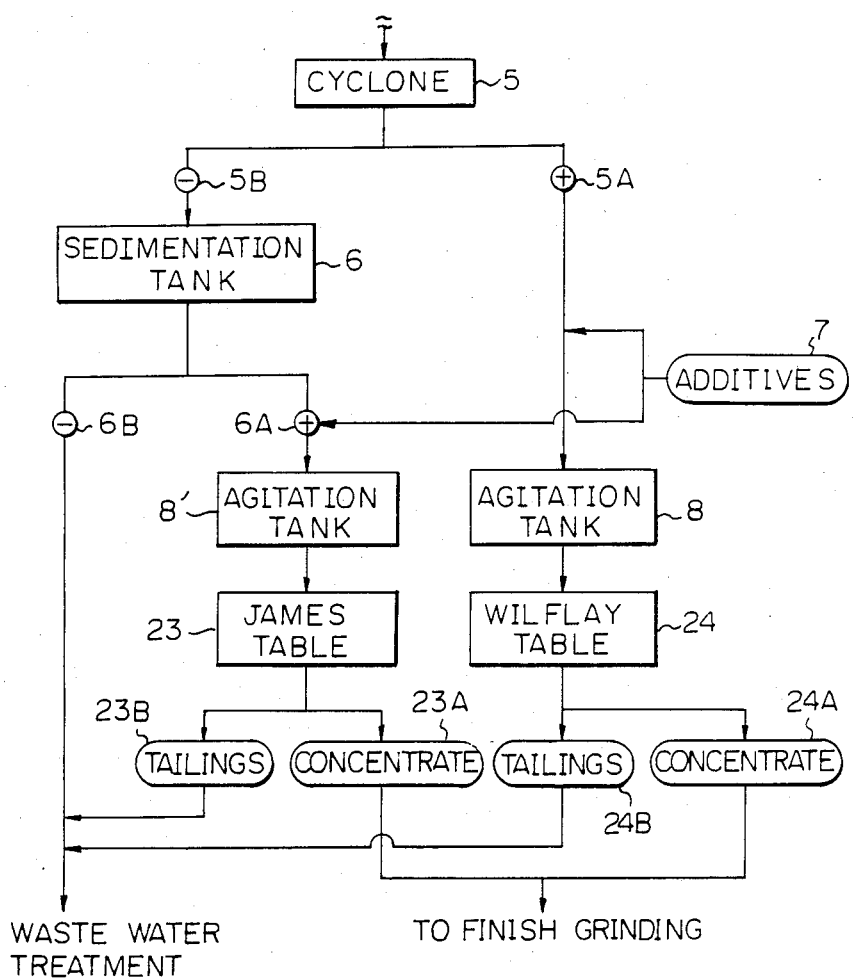
Figure 8A:
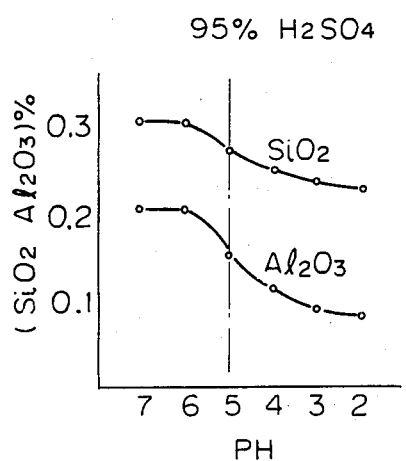
FIGS. 8(a) to 8(d) are graphs showing the effect of pH in the acid treatment with various acids on the $SiO_2$ and $Al_2O_3$ content of the product.
Figure 8B:
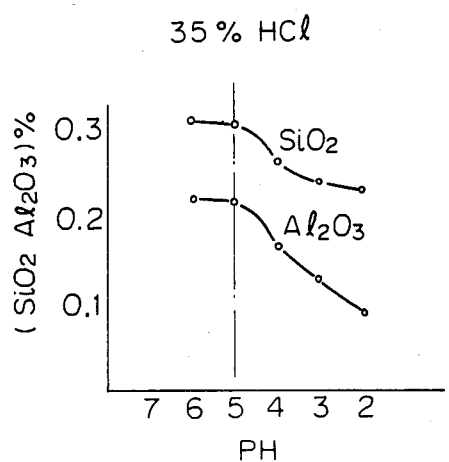
Figure 8C:
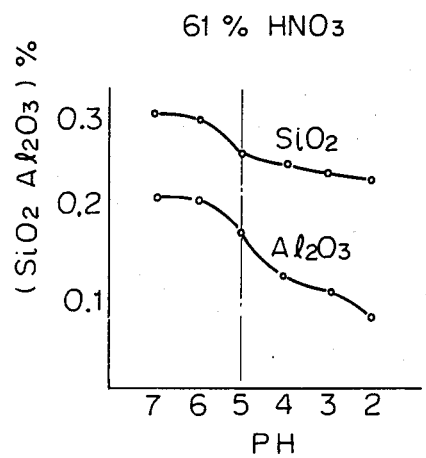
Figure 8D:
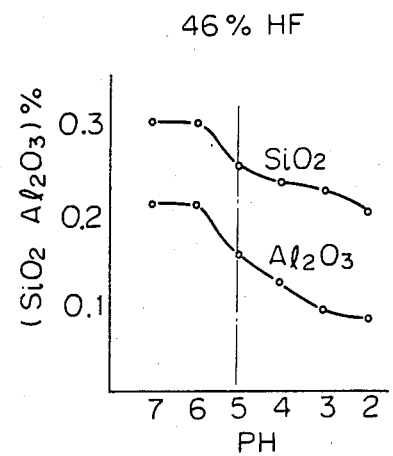

If desired, the table concentration in the above process may be conducted after dividing the ore particles into two groups, relatively fine and coarse, as shown in FIGS. 3 and 4. In the embodiment shown in FIG. 3, the underflow 5A of the cyclone 5 is passed through a hydraulic classifier 21. The underflow 21A of the classifier 21 is passed to a sedimentation tank 22, while the overflow 21B is combined with the overflow B from the cyclone 5 and passed to a sedimentation tank 6. The overflows 6B and 22B of the two tanks 6 and 22 are discharged as tailings. The underflow 6A of the tank 6 which contains finer particles than the underflow 22A of the tank 22 is directly refined by a James table concentrator 23, while the underflow 22A of the tank 22 is refined by a Wilflay table 24 after addition of suitable additives 7 and agitation in an agitation tank 8. Although not shown, the concentrates 23A and 24A from the two table concentrators may be combined and passed together to the subseqent step such as flotation or finish grinding. Alternatively, as shown, only the concentrate 23A from the James table 23 may be further refined by a flotator 20, after which the concentrate 20A at the flotator is combined with that (24A) of the Wilflay table 24 and passed to the finish grinding step.

In FIG. 4, the underflows 5A and 6A from the cyclone 5 and sedimentation tank 6, respectively, are separately refined with a Wilflay table 24 and a James table 23 after addition of suitable additives 7 to each flow and agitation thereof in an agitation tank 8 or 8'. The concentrates 23A and 24A from these table concentrators 23 and 24 may be combined and passed to the finish grinding step as shown. Alternatively, these concentrates may be processed in other ways as described above with respect to FIG. 3.

As mentioned previously, the classified ores may be treated with an acid solution prior to or during the gravity concentration in order to facilitate removal of gangues from the ore particles, and in such cases the subsequent gravity concentration such as table concentration and/or flotation is carried out under acidic conditions, in contrast with the usual weak alkaline conditions mentioned above. Such acid treatment may be conducted in the agitator 8 in the process shown in FIG. 2 and the additives 7 added to the slurry being introduced into the agitator comprise a strong acid and optionally one or more flotation agents such as a foaming agent, collector, gangue depressant, depressing agent, activator, and/or modifier as listed above. The acid is preferably added in such an amount that the pH of the slurry is lowered to not higher than 5, and more preferably not higher than 4. The residence time of the acid-containing slurry in the agitator is generally between 15 to 120 minutes and preferably from 30 to 90 minutes. Such acid treatment may be applied to other suitable flows in the process; for example, the concentrate 9A from the table concentrator 9 may be subjected to acid treatment in the same manner.

When the ore particles are treated with an acid prior to or during the gravity concentration, the ore particles in the concentrate discharged from the refining step should be washed with water to remove the acid from the surface thereof. As shown in FIG. 2, the concentrate 9A or 20A from the table concentrator 9 or flotator 20 is introduced into a washing tank 10 where the refined particles are thoroughly washed with water with agitation and the washed concentrate 10A is passed to the finish grinder 13. The washings 10B discharged from the tank 10 are passed to a neutralizing tank where they are neutralized by addition of an alkali 11 such as lime milk, before they are directed to waste water treatment facilities (not shown).

Various tailings produced in the process which include the overflows 6B and 22B of the sedimentation tanks, and washings 10B, as well as tailings 9B, 20B, 23B, and 24B of the table concentrators or flotator may be combined and passed to a dehydrater or filter. The dehydration or filter cake may be utilized in steelmaking (e.g., in the manufacture of sintered ores), while the discharged water which contains very fine particles may be recycled to the process.

There are many variations in carrying out the above-mentioned acid treatment and the gravity concentration operations as shown in FIGS. 5–7. In FIG. 5, a strong acid such as sulfuric acid is added to the slurry of classified ore particles contained in or being passed to the agitation tank 8 in an amount sufficient to lower the pH of the slurry to about 5 or below, and pine oil and TMDCA are also added thereto in effective amounts as flotation agents. The slurry is then agitated in the tank 8 for a sufficient period whereby it is separated into a lower ore layer 8A and an upper gangue-containing foam layer 8B. The lower ore layer 8A is pumped to a table concentrator 9 where gravity concentration of the ore particles under the action of flotation agents is effected. The concentrate is directed to the finish grinding step after washing with water.

In the embodiment shown in FIG. 6 which illustrates a combination of acid treatment and flotation, only a strong acid is added to the slurry in the agitation tank 8. After the slurry is agitated therein for a sufficient time, the slurry is discharged from the bottom of the tank 8 and pumped to a flotator 20 via a conditioning tank 20'. Pine oil is added to the conditioning tank 20' and TMDAC is added to the flotator 20. In the flotator 20, the slurry is separated into a concentrate 20A and tailings 20B (foam layer).

As shown in FIG. 7, the acid treatment may be combined with both of table concentration and flotation. After the slurry in an agitation tank 8 is agitated with an acid, it is refined by a table concentrator 9 and the concentrate 9A of the table concentrator is then subjected to flotation as in FIG. 6 by passing through a conditioning tank 20' to a flotator 20. In this case, if desired, a strong acid may be added also to the conditioning tank 20' along with pine oil.

Among the embodiments shown in FIGS. 5 to 7, the procedure shown in FIG. 5 is the most preferable in view of the refining effect and the number of operations. Other variations will be conceivable to those skilled in the art.

FIGS. 8(a)-8(d) shows the relationship between the product grade (% $SiO_2$ and % $Al_2O_3$) and pH of the slurry in the acid treatment using the various acids indicated. The process used in the experiments was the same as shown in FIG. 2 in which the ore treated with an acid solution in the tank 8 is refined by table concentration as shown in FIG. 5. The acid treatment was carried out at a slurry concentration of 40% by weight for 60 minutes at room temperature under agitation at 50 to 80 r.p.m. The flotation agents added to the slurry were pine oil [150 g/t in (a), 200 g/t in (b) and (c), and 130 g/t in (d)] and TMDAC [230 g/t in (a), 250 g/t in (b) and (c), and 200 g/t in (d)]. As is apparent from these graphs, the desired high grade of the product can be readily obtained by acid treatment at pH values below 5, and preferably below 4.

In the cases where the acid treatment of the ore is employed, it is preferred that the inside surface of the table concentrator and the flotator (including the conditioning tank) be lined with rubber so as to withstand the attack by the acid and the heavy iron ore particles.

The following examples are presented as specific illustrations of the claimed invention. It should be understood, however, that the invention is not restricted to the specific details set forth in the examples. Throughout the specification all the percents are by weight unless otherwise indicated.

EXAMPLE 1

A high grade speculite-type hematite ore occurring in Brazil and available as a pellet feed in powdery form was used as a raw material to prepare fine powder of iron oxide according to the process shown in FIG. 2 without preliminary grinding. The table concentration was carried out with two table concentrators, a James table and a Wilflay table, and only the concentrate of the James table was then subjected to flotation in the manner shown in FIG. 3. The concentrate of the flotator was combined with that of the Wilflay table and passed to the finish grinder as shown in FIG. 3. The compositions and average particle sizes (APS) of the raw material and the product are shown in Table 3 together with the "proportion" of the raw material in which the "proportion" means the value calculated by the foregoing formula, i.e., $[(II)+(III)]/(IV) \times 100$, where (II), (III), and (IV) are as defined above. Table 4 shows the particle size distributions of the raw material 1, the ores before and after the two table concentrators, i.e., unrefined ores 22A, 6A and concentrates 24A, 23A, the concentrate 20A of the flotation, and the product 19 after finish grinding.

It can be seen from Table 3 that the purity of the product met the specifications defined in JIS-K-1462 under Class 3. The product had excellent magnetic properties as follows: Br (G) 4200, Hc (Oe) 2240, and (BH)m MGO 4.10. Table 4 shows that both of the two types of classified ore 22A and 6A introduced into the table concentrators were substantially free from fine particles smaller than 10 μm.

TABLE 3

| | $Fe_2O_3$ | $SiO_2$ | $Al_2O_3$ | MgO | MnO | CaO | $Cr_2O_3$ | Proportion | APS |
|---|---|---|---|---|---|---|---|---|---|
| | | | | | | | | | (% by weight) |
| Raw material | 97.01 | 1.1 | 0.98 | 0.06 | 0.4 | 0.03 | 0.01 | 0.4 | 40 μm |
| Product | 99.10 | 0.15 | 0.05 | 0.02 | 0.3 | 0.01 | 0.006 | | 1.5 μm |

TABLE 4

| | | | | | | | | (% by weight) |
|---|---|---|---|---|---|---|---|---|
| | | | | | | | | (μm) |
| | +120 | ~63 | ~30 | ~20 | ~10 | ~5 | ~1 | −1 |
| Raw Material (1)* | 5.2 | 18.1 | 27.2 | 23.0 | 13.1 | 8.5 | 3.5 | 1.4 |
| Before Wilflay (22A) | 8.0 | 50.2 | 38.9 | 2.1 | | ←—0.8—→ | | |
| Before James (6A) | 2.2 | 25.2 | 48.3 | 14.2 | 8.7 | ←—1.4—→ | | |
| After Wilflay (24A) | 9.1 | 60.7 | 30.0 | 0.2 | | ←—0—→ | | |
| After James (23A) | 4.9 | 37.3 | 49.9 | 6.2 | 1.5 | ←—0.2—→ | | |
| After Flotation (20A) | 3.7 | 38.9 | 67.9 | 8.6 | 0.9 | ←—0—→ | | |
| Product (19) | | | ←—0—→ | | | 0.4 | 27.3 | 72.3 |

*The numbers in parentheses correspond to the reference numerals in FIGS. 2 or 3.

EXAMPLES 2-5

The procedure described in Example 1 was repeated with various iron oxide ores as raw materials. Specifically, the raw materials used were a high grade hematits ore similar to that employed in Example 1 (Example 2), high grade magnetite ore (Example 3), magnetite sand (Example 4), and relatively low grade magnetits ore (Example 5). Examples 4 and 5 are comparative. The compositions and the average particle sizes (μm) of each raw material and product are summarized in Table 5 below together with the "proportions" of the raw materials.

As is apparent from the results shown in Table 5, when the proportion of the ore used as the raw material exceeds 1.5%, the gravity concentration could not achieve a satisfactory refining effect and the purity of the product could not meet the JIS specifications. In contrast, the products obtained from a raw material having the "proportion" of 1.5% or less were satisfactorily refined. Measurement of the magnetic properties of the product of Example 2 showed results comparable to those of the product of Example 1.

TABLE 5

| Example No. | $Fe_2O_3$ | FeO | $SiO_2$ | $Al_2O_3$ | MgO | CaO | MnO | $Cr_2O_3$ | $TiO_2$ | Proportion | APS |
|---|---|---|---|---|---|---|---|---|---|---|---|
| | | | | | | | | | | | (% by weight) |
| This Invention | | | | | | | | | | | |
| 2 Raw material | 95.03 | — | 1.65 | 1.28 | 0.06 | 0.04 | 0.5 | 0.01 | — | 0.6% | 40 μm |

TABLE 5-continued

| Example No. | | Fe₂O₃ | FeO | SiO₂ | Al₂O₃ | MgO | CaO | MnO | Cr₂O₃ | TiO₂ | Proportion | (% by weight) APS |
|---|---|---|---|---|---|---|---|---|---|---|---|---|
| | Product | 99.30 | — | 0.10 | 0.05 | 0.02 | 0.01 | 0.35 | 0.006 | — | — | 1.5 μm |
| 3 | Raw material | 84.3 | 9.9 | 3.0 | 0.11 | 0.2 | 0.6 | 0.8 | — | — | 1.5% | 60 μm |
| | Product | 88.0 | 10.3 | 0.2 | 0.05 | 0.2 | 0.5 | 0.1 | — | — | — | 1.5 μm |
| | Comparative | | | | | | | | | | | |
| 4 | Raw material | 80.2 | — | 4.3 | 3.9 | — | 1.6 | 0.4 | — | 7.3 | 11.6% | 100 μm |
| | Product | 87.0 | — | 0.25 | 0.15 | — | 1.7 | 0.4 | — | 7.9 | — | 1.5 μm |
| 5 | Raw material | 69.0 | 18.3 | 8.02 | 2.00 | — | 1.0 | 0.08 | — | 0.31 | 1.6% | 50 μm |
| | Product | 77.6 | 20.1 | 0.2 | 0.05 | — | 1.4 | 0.09 | — | 0.34 | — | 1.5 μm |

EXAMPLE 6

In order to study the effect on refining of the particle size of the ore subjected to gravity concentration, a high grade hematite iron ore was ground to different particle sizes and refined by flotation under the same conditions after classification. The Fe₂O₃, SiO₂, and Al₂O₃ contents in the refined ore and the raw ore are given in Table 6 below.

TABLE 6

| | APS | Size distribution | Fe₂O₃ | SiO₂ | Al₂O₃ |
|---|---|---|---|---|---|
| A | 150 μm | 10~250 μm | 99.62 | 0.09 | 0.08 |
| B | 5 μm | 0.5~20 μm | 95.84 | 0.98 | 0.85 |
| | Raw ore before flotation | | 95.73 | 0.95 | 0.88 |

The raw material in Run B having an APS of 0.5 μm and containing fine particles smaller that 10 μm in a substantial proportion could not achieve a satisfactory refining effect by flotation.

EXAMPLE 7

Fine powder of iron oxide was prepared from a powdery high grade hematite ore according to the process shown in FIG. 2. In this example, acid treatment was conducted by adding sulfuric acid to the slurry in the agitation tank 8 in FIG. 2. The acid treatment (effected at pH 2) and the subsequent gravity concentration were carried out in three ways as shown in FIGS. 6-8. More specifically, the three ways are (1) acid treatment in the presence of pine oil and TMDAC→table concentration (FIG. 6), (2) acid treatment→flotation (FIG. 7), and (3) acid treatment→table concentration→flotation (FIG. 8). The classified powder introduced into the agitation tank had an average particle size of about 40 μm and contained less than 2% of fine particles smaller than 10 μm. The compositions and the average particle sizes of the raw material and the products are summarized in Table 7 below. All the products had satisfactory magnetic properties as shown in Table 8.

EXAMPLE 8

A high grade hematite ore powder having an average particle size in the range of from 40 to 60 μm and containing 97.5% Fe₂O₃, 1% SiO₂ and 1% Al₂O₃ was classified in a wet cyclone so as to remove fine particles smaller than 10 μm. The classfied powder was recovered in an yield of about 70% as the underflow, which contained 0.6% each of SiO₂ and Al₂O₃. Thus, the classification had an appreciable refining effect of the ore.

As described in the above, according to the process of the present invention, highly pure iron oxide fine powder which can satisfy the target grade as defined in JIS-K-1462 under Class 3 can be produced by inexpensive physical refining of an oxide iron ore.

Although the present invention has been described with preferred embodiments it is to be understood that variations and modifications may be employed without departing from the concept of the invention as defined in the following claims.

TABLE 7

| | Fe₂O₃ | SiO₂ | Al₂O₃ | MgO | MnO | CaO | Cr₂O₃ | APS | (% by weight) Remarks |
|---|---|---|---|---|---|---|---|---|---|
| Raw material | 97.01 | 1.10 | 0.98 | 0.04 | 0.30 | 0.03 | 0.02 | 40 μm | "Proportion" = 0.4% |
| Product (1) | 99.35 | 0.10 | 0.04 | 0.01 | 0.33 | 0.01 | 0.007 | 1.5 μm | FIG. 6 |
| Product (2) | 99.10 | 0.26 | 0.07 | 0.03 | 0.35 | 0.02 | 0.015 | 1.5 μm | FIG. 7 |
| Product (3) | 99.14 | 0.12 | 0.05 | 0.02 | 0.35 | 0.01 | 0.011 | 1.5 μm | FIG. 8 |

TABLE 8

| | Br (G) | Nc (Oe) | (BH)m (MG Oe) | Remarks |
|---|---|---|---|---|
| Product (1) | 4150 | 3160 | 4.18 | FIG. 6 |
| Product (2) | 4130 | 3100 | 4.11 | FIG. 7 |
| Product (3) | 4170 | 3120 | 4.23 | FIG. 8 |

What is claimed is:

1. A process for producing iron oxide fine powder of high purity from an oxide iron ore, comprising the steps of:
    (a) providing as a raw material an oxide iron ore or a mixture thereof in the form of preliminarily ground powder in which the total amount of metal oxide impurities having a specific gravity between 4.5 and 5.5 and/or being capable of forming an iron compound with an iron oxide present in the raw material is not greater than 1.5% by weight based on the total weight of iron oxides present therein;
    (b) subjecting the iron ore powder to classification under such conditions that fine particles smaller than 10 μm in diameter are removed from the ore powder;
    (c) refining the ore powder by means of gravity concentration; and
    (d) finish grinding the refined powder to reduce the particle size to a desired level.

2. The process according to claim 1 wherein the total amount of metal oxide impurities having a specific gravity between 4.5 and 5.5 and/or being capable of forming an iron compound with an iron oxide present in the raw material is not greater than 1.3% by weight based on the total weight of iron oxides present therein.

3. The process according to claim 1 wherein the content of iron oxides in the raw material is at least 90% by weight.

4. The process according to claim 1 wherein the average particle size of the preliminarily ground raw material is in the range of from 20 to 200 μm.

5. The process according to claim 1 wherein the raw material is selected from hematite, magnetite, and a mixture thereof.

6. The process according to claim 5 wherein the raw material is hematite.

7. The process according to claim 1 wherein the powder obtained by the classification in step (b) contains up to 15% by weight of fine particles smaller than 10 μm in diameter.

8. The process according to claim 7 wherein the powder obtained by the classification in step (b) contains up to 5% by weight of fine particles smaller than 10 μm in diameter.

9. The process according to claim 1 wherein the classification in step (b) is carried out under such conditions that coarse particles greater than 250 μm in diameter are also removed in addition to fine particles smaller than 10 μm in diameter.

10. The process according to claim 1 wherein the refining in step (c) is carried out by means of either table concentration or flotation, or a combination of both.

11. The process according to claim 1 wherein the classified raw material powder obtained in step (b) is subjected to acid treatment by dipping the powder in an acid solution prior to or during the refining in step (c).

12. The process according to claim 11 wherein the acid solution has a pH of not greater than 5.

13. The process according to claim 11 wherein the acid solution has a pH of not greater than 4.

14. The process according to claim 11 wherein the acid treatment is carried out in the presence of one or more flotation agents with agitation.

15. The process according to claim 11 wherein the acid treatment is carried out, after which the powder is refined by table concentration.

16. The process according to claim 1 wherein the iron oxide fine powder product contains at least 98.5% by weight iron oxide.

17. The process according to claim 16 wherein the $SiO_2$ and $Al_2O_3$ contents of the iron oxide fine powder product are not greater than 0.3% and not greater than 0.1% by weight, respectively.

18. The process according to claim 1 wherein the iron oxide fine powder product obtained after the finish grinding in step (d) has an average particle size suitable for use in the manufacture of ferrite magnets.

19. The process according to claim 18 wherein the average particle size of the iron oxide product is in the range of from 0.5 to 5.0 μm, and preferably in the range of from 0.8 to 2.0 μm.

20. A process for producing iron oxide fine powder of high purity from a hematite ore, comprising the steps of:
   (a) providing a hematite ore raw material in the form of preliminarily ground powder in which the total amount of metal oxide impurities having a specific gravity between 4.5 and 5.5 and/or being capable of forming an iron compound with an iron oxide present in the raw material is not greater than 1.5% by weight based on the total weight of iron oxides present therein;
   (b) subjecting the hematite powder to classification under such conditions that fine particles smaller than 10 μm in diameter are removed from the hematite powder;
   (c) refining the ore powder by means of gravity concentration; and
   (d) finish grinding the refined powder to reduce the particle size to a desired level.

21. A process for producing iron oxide fine powder of high purity from an oxide iron ore, comprising the steps of:
   (a) providing as a raw material an oxide iron ore or a mixture thereof in the form of preliminarily ground powder in which the total amount of metal oxide impurities having a specific gravity between 4.5 and 5.5 and/or being capable of forming an iron compound with an iron oxide present in the raw material is not greater than 1.5% by weight based on the total weight of iron oxides present therein;
   (b) subjecting the iron ore powder to classification under such conditions that fine particles smaller than 10 μm in diameter are removed from the ore powder;
   (c) treating the ore powder with an acid solution of pH 5 or below prior to or during the subsequent refining step;
   (d) refining the ore powder by means of gravity concentration; and
   (e) finish grinding the refined powder to reduce the particle size to a desired level.

22. The process according to claim 21 wherein the acid treatment in step (c) is carried out in the presence of one or more flotation agents with agitation.

23. The process according to claim 21 wherein the pH of the acid solution is 4 or below.

24. The process according to claim 21 wherein after the acid treatment in step (c) the powder is refined by table concentration in step (d).

* * * * *